Figure 1:
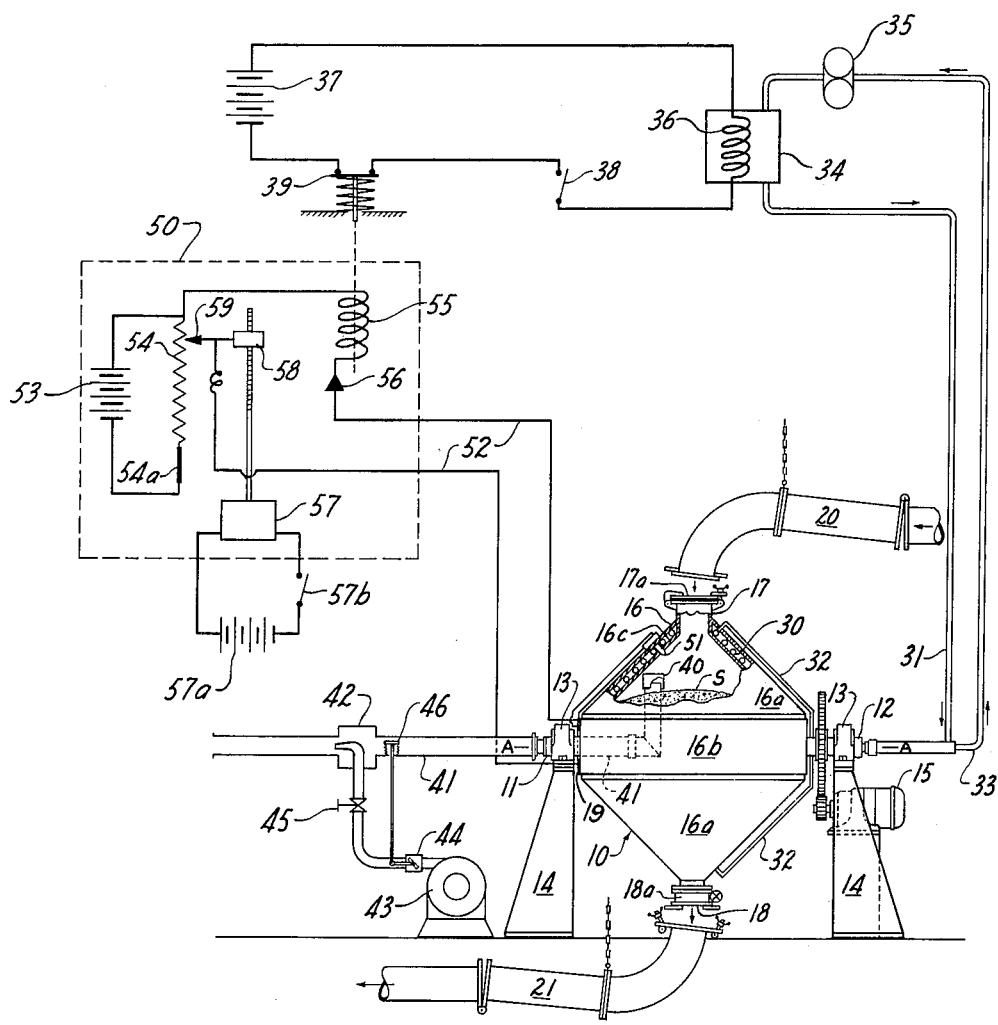

Oct. 26, 1965  J. L. TRETTEL  3,213,547
PROCEDURE AND APPARATUS FOR DRYING BLEACHED SHELLAC
Filed Dec. 7, 1962

INVENTOR.
JAMES L. TRETTEL
BY
Green, McCallister & Miller
HIS ATTORNEYS 3,213,547
PROCEDURE AND APPARATUS FOR DRYING
BLEACHED SHELLAC
James L. Trettel, Pittsburgh, Pa., assignor to J. P. Devine
Manufacturing Company, Pittsburgh, Pa., a corporation
of Pennsylvania
Filed Dec. 7, 1962, Ser. No. 242,995
12 Claims. (Cl. 34—15)

This invention relates to improved procedure and apparatus for removing moisture from bleached granulated shellac. This invention relates more particularly to a shellac drying procedure wherein a tumble-type vacuum drier is employed and is controlled according to a specific schedule, so as to rapidly remove moisture from the shellac without fusing the shellac granules.

The majority of present day shellac users require a substantially colorless, transparent form of the complex shellac resin. Accordingly, orange shellac as imported from the shellac producing countries of the East, such as India, must be processed to be suitable for use. The processing consists of dissolving low grade or highly colored shellac in a hot water solution of borax and soda. Chlorine gas or other similar bleaching agents are introduced into the solution until the color has changed from orange to white. Finally, sulfuric acid is introduced into the solution to precipitate the shellac. The shellac is removed from the processing vats in large chunks or slabs which are crushed into small pieces or granules resembling wet white sand in appearance and consistency. The thus formed granulated white shellac is then ready for drying.

It is the current practice of shellac processors to dry bleached granulated shellac in a shelf-type chamber drier. The shellac is spread evenly over large pans at a depth of about 2 inches and the pans are placed on shelves in the drying chamber. The chamber pressure is reduced to about 25–50 mm. Hg absolute and heat is added to the shellac by direct conduction through the pans. In four to eight hours the drying process is completed and the pans are removed from the chamber. Invariably, the shellac particles in the pans are fused into slabs or blocks that must be pried or beat from the pans and reground or crushed to a granular consistency before the shellac can be used. The pans became distorted due to the frequent beating required to separate the slabs from the pans. Naturally, distorted pans cause uneven heating of subsequent batches that results in localized burning and non-uniform coloring of the shellac.

Thus, it will be seen that the currently popular shellac drying procedure includes as substantial cost factors: the inefficient use of labor, shop floor space, and processing time, as well as wastage due to spillage, dusting, and spoiled product.

Accordingly, it has been an object of my invention to fully investigate the nature and commercial requirements of shellac and shellac drying procedures, and to devise a method by which shellac can be dried without fusing of individual granules whereby the cost of producing white shellac will be reduced;

Another object of my invention has been to devise a shellac drying procedure that eliminates the possibility of localized burning and inadequate drying to thus improve the overall quality of the dried shellac;

Another important object of my invention has been to devise a method of drying shellac in a vacuum tumble drier that can be loaded and unloaded with at least semi-automatic equipment;

A further object of my invention has been to provide an apparatus for automatically performing substantially the entire drying procedure of my invention;

These and other objects of my invention will appear to those skilled in the art on reading and understanding the following specific description thereof.

One phase of my invention consists of heating an amorphous body of granulated shellac by conduction and radiation from a heated surface having a temperature that is scheduled to increase as a function of time, while subjecting the body to a low pressure (10 to 15 mm. Hg depending upon the nature of the shellac being processed) and continuously-gently immingling, intramixing, or homogenously redistributing particles within the amorphous body to prevent localized overheating or underdrying. I have determined that by subjecting the shellac to a sufficiently low pressure, it is possible to add heat to the shellac without melting or softening it. I have also determined that, oddly enough, the heat addition can increase as processing time progresses. I have found that a vacuum tumble drier is a convenient apparatus for performing this method as it permits a close control of temperature, pressure, and agitation rate and can be easily loaded and unloaded by automatic or semi-automatic equipment.

The following tables show the specific temperature and pressure requirements of my procedure:

(I) REGULAR WHITE SHELLAC

Maximum pressure, 10 mm. Hg absolute

| Time: | Temperature of heating surface (degrees F.) |
|---|---|
| First hour | 80 to 90 |
| Second hour | 90 to 100 |
| Third hour | 100 to 110 |
| Fourth hour to completion (six-hour maximum) | 110 to 120 |

(II) WAX-FREE WHITE SHELLAC

Maximum pressure, 15 mm. Hg absolute

| Time: | Temperature of heating surface (degrees F.) |
|---|---|
| First hour | 80 to 85 |
| Second hour | 85 to 90 |
| Third hour | 90 to 95 |
| Fourth hour to completion (six-hour maximum) | 95 to 100 |

While the procedures tabulated above, indicate temperature ranges and maximum pressures which I have found to optimize drying time and dry product quality, I have determined that processing within about plus or minus 15% of these limits will successfully dry shellac without undue balling or cohesion of the granules.

I have also found that while the foregoing tabulated stepwise temperature increases are satisfactory and especially convenient for manual control of my process, it is possible, especially with automatic controls, to continuously increases the temperature at a rate similar to that suggested by the tables. Specifically, for regular white shellac the process is commenced with a heating surface temperature of 80° to 90° F. For the first three hours of the process the temperature is increased at the rate of 10 Fahrenheit-degrees per hour. Beginning with the fourth hour and continuing until drying is completed, the temperature is held at 110° F. to 120° F. For wax-free white shellac the process is commenced with a heating surface temperature of 80° F. to 85° F. For the first three hours of the process the temperature is increased at the rate of 5 Fahrenheit-degrees per hour. Beginning with the fourth hour and continuing until drying is completed, the temperature is held at 95° to 100° F.

Attempts have been made in the past to dry shellac without fusing the granules; however to my knowledge, all prior attempts have failed to dry the shellac within any reasonable time (less than 10 hours), or have resulted in balling or gumming of the shellac which not only produced an unsatisfactory product, but fouled the processing machinery as well.

Another phase of my invention relates to control mechanism that senses and automatically controls the necessary process parameters (pressure, temperature, and time) which, with the use of my tumble drier will provide a practically completely automated drying mechanism.

In the accompanying drawing, FIGURE 1 is an elevational view of a vacuum tumble drier, its related auxiliary equipment, and a control system therefor, all of which cooperate to automatically perform the novel method of my invention.

Referring more specifically to the drawings, there is shown a container, mixing chamber, or vessel 10 for processing an amorphous body of bleached granular shellac S. The vessel 10 is rotatably supported by a pair of diametrically opposed shafts or trunnions 11 and 12 that are respectively carried by suitable bearing means 13 on a pair of stands 14. A drive mechanism, such as transmission and motor means 15 is operatively connected to the trunnion 12 to rotate the vessel 10 about a trunnion axis A—A at speeds varying from 3 to 12 r.p.m. depending inversely upon the size of the vessel. The vessel 10 has an envelope or side wall 16 that advantageously is formed of a pair of opposed base-to-base conical portions 16a which are separated by a centrally positioned cylindrical portion 16b.

At the apex of one conical portion 16a there is provided a filling port or inlet opening 17 and a door or valve 17a which tightly closes or seals the opening 17 during operation of the vessel 10. At the apex of the opposed conical portion 16a there is provided a product discharge port or outlet opening 18 and valve or discharge control means 18a for tightly closing the outlet opening 18 during operation of the vessel 10. It will be apparent that loading and unloading the vessel 10 can be readily accomplished by semi-automatic equipment such as a movable pressure driven conveyor or supply conduit 20 and a movable vacuum driven discharge conduit or conveyor 21.

The side wall 16 of the vessel 10 includes an internal or chamber portion defining surface 16c that is entirely heated by uniformly distributed electric, liquid, or gaseous heating means. The heating means shown in the drawing is a conduit or heating-liquid coil 30.

The heating coil 30 receives a high specific heat liquid such as water at a controlled temperature from a supply conduit 31 that conveniently passes through the trunnion 12, and a pair of branch conduits 32. Spent or cooled water is exhausted, also through the trunnion 12 to an exhaust conduit 33 and is recirculated through a heater 34 by a pump 35. The heater 34 includes heat release means or electrical coil 36 that is in a circuit including a current source or battery 37, a starting switch 38 and a normally closed control switch 39. The coil 36 is heated when the switches 38 and 39 are both closed.

Returning to the vessel 10, there is shown means for evacuating the vessel interior to create a sub-atmospheric pressure therein which comprises a downwardly facing vacuum dust trap, filler or gas discharge means 40 that is supported by and communicates with a stationary vacuum pipe or conduit 41. Conveniently, the conduit 41 passes through the trunnion 11 and is connected to a source of low pressure such as a steam driven ejector pump 42. A boiler 43 or other source of pressurized steam is connected through a control valve 44 and a manually operated shut-off valve 45 to the pump 42.

In FIGURE 1 there is also shown control mechanism for directing the operation of the vessel 10 according to my novel procedure. Generally speaking, the control mechanism includes means for controlling the temperature of the walls 16c in accordance with the time schedules required by my novel procedure, and means for maintaining the pressure within the vessel 10 at the low pressures that are necessary for my procedure.

Control of the wall temperature can be by any of several known variable datum controllers such as a simple potentiometer-thermocouple circuit 50 shown in the drawings. The temperature of the wall 16c is continuously sensed by a voltage-producing thermocouple 51 which is located in or adjacent to the wall 16c. The electrical signal or voltage thus produced is conveyed via brush and collector ring means 19 mounted adjacent the trunnion 11 and signal transmitting means or wires 52, to the controller circuitry.

In the controller circuitry, the temperature indicating voltage is compared to a datum voltage that is established by a standard battery or voltage source 53 and a preselected portion of a variable resistance, voltage divider, or potentiometer 54 that is connected across the battery 53. A circuit-output-solenoid 55 and a current-direction-limiting rectifier 56 are connected in the wires 52 whereby a flow of current in wires 52 in the direction permitted by the rectifier 56 will energize the solenoid 55 and open the normally closed switch 39 to interrupt the flow of current to the heater coil 36.

If the temperature-responsive thermocouple voltage equals the preselected datum voltage, there will be no unbalance of potential within the circuitry and no current will flow in the wires 52 and the solenoid 55. If the temperature-responsive thermocouple voltage indicates a temperature less than that called for by the preselected datum, a potential unbalance will exist tending to cause a flow of current in opposition to the rectifier 56; however, due to the rectifier 56 no current will flow in lines 52 or in solenoid 55. When the temperature-responsive thermocouple voltage indicates a wall temperature higher than that called for by the preselected datum voltage, an unbalance of potential will exist and current will flow in the wires 52 and through the rectifier 56 to energize the solenoid 55, open the switch 39 and reduce the temperature of the wall 16c.

Proper performance of my novel drying procedure requires that the temperature of the wall 16c must increase either continuously or in steps as the drying cycle proceeds or with respect to time. Accordingly, I have provided a time responsive mechanism or motor 57 for driving a mechanical variable position mechanism such as a screw jack 58 to reposition a follower 59 along the potentiometer 54. A circuit for energizing the motor 57 includes a current source or battery 57a and a starting switch 57b. It will thus be seen that the datum against which the temperature-responsive thermocouple voltage is compared will be varied as a function of processing time. As the final stages (beginning with the fourth hour) of my drying process require that a constant temperature be maintained, a final segment 54a of the potentiometer 54 is constructed to be of low resistance. Accordingly, the datum voltage selected by follower 59 will not vary substantially when the follower engages the portion 54a of the potentiometer 54.

Various conventional pressure control mechanisms can be employed to maintain the pressure within the vessel 10 at the low value required for proper performance of my process. In the drawings, I have shown a simple evacuated bellows 46 that is positioned within the conduit 41 to sense the pressure therein which is directly related to the pressure within the chamber 10. The evacuated bellows 46 is mechanically connected to the control valve 44 to vary the supply of steam from the boiler 43 to the ejector pump 42. If the pressure within the chamber 10, and hence the conduit 41, rises above the permissible value, the bellows 46 is collapsed, causing the valve 44 to open and admit more steam to the pump 42, thereby reducing the pressure within the vessel 10 to the required value.

The operation of the apparatus described above is as follows: The elements of the control unit are pre-chosen (or adjusted) according to whether regular or wax-free shellac is to be processed. The movable conduit 20 is connected to the inlet opening 17 and wet granulated bleached shellac is supplied under conveying pressure therethrough until the vessel 10 is approximately 70% full. The inlet door 17a is tightly closed and evacuation of vessel by the steam driven ejector pump 42 is commenced by opening the shut-off valve 45. The vessel 10 is rotated by the motor and transmission means 15 to cause a continuous and homogeneous redistribution of the amorphous body of shellac granules S within the vessel. The temperature controller circuit 50 is then energized by the closure of switches 38 and 39 and heated fluid is supplied to the heating coil 30 to bring the temperature of the wall 16c to the level required by the appropriate processing table. As the process continues, the pressure within the vessel 10 is automatically maintained at the appropriate level by the pressure sensing mechanism 46 and the control valve 44. Also, the time responsive mechanism 57 continuously (or stepwise) varies the voltage datum of the control circuitry to cause the temperature of the vessel walls 16c to gradually increase at the rate prescribed by the appropriate tabulated procedure. After four to six hours, the drying process has been completed and the heating and vacuum controls are de-energized. The vessel is stopped in the position shown in the drawing and the conveyer 21 is connected to the outlet opening 18 whereby the dry shellac is removed from the drying vessel in granular form and is ready for immediate shipment to the consumer.

I have found that by following the above described procedures or employing automatic apparatus as described, a fully satisfactory shellac product is obtained at considerably less cost than is presently required to produce a similar product. It have also determined that there is no cohesion of shellac granules between themselves and also between themselves and the vessel wall 16c. Accordingly, it is always possible to get complete or 100% of discharge of dry shellac from the vessel 10.

Having thus described in detail the procedure of my invention and specific apparatus for carrying out that procedure I claim:

1. Apparatus for drying granulated bleached shellac comprising: a vessel having trunnions that are rotatably mounted on stands, a side wall that defines an interior chamber portion, sealable inlet and outlet means for permitting the introduction of wet shellac into said interior chamber portion and the discharge of dry shellac therefrom; means for rotating said vessel on said stands, means for creating a sub-atmospheric pressure within said interior chamber portion; means for heating the interior surface of said side wall; and means for controlling the operation of said vessel, said control means including means responsive to the pressure within the interior chamber portion for controlling said evacuating means to maintain said interior chamber pressure below a predetermined sub-atmospheric level, and means responsive to time and the temperature of the internal surface of said side wall and operatively connected to said heating means for increasing the temperature of the interior surface of said side wall as a function of time.

2. Apparatus for drying granulated bleached shellac comprising: a vessel having trunnions that are rotatably mounted on stands, a side wall that defines an interior chamber portion, sealable inlet and outlet means for permitting the introduction of wet shellac into said interior chamber portion and the discharge of dry shellac therefrom; means for rotating said vessel on said stands; means for creating a sub-atmospheric pressure within said interior chamber portion; means for heating the interior surface of said side wall; and means for controlling the operation of said vessel, said control means including means responsive to the pressure within the interior chamber portion for controlling said evacuating means to maintain said interior chamber pressure at no greater than substantially 15 mm. Hg absolute, and means operatively connected to said heating means to maintain the temperature of the internal surface of said side wall below that which causes softening of the shellac.

3. The method of drying granulated bleach shellac which comprises the steps of:
   (a) collecting an amorphous body of granulated wet bleached shellac,
   (b) continuously-homogeneously redistributing the granules within the amorphous body, while
   (c) subjecting the body to a low sub-atmospheric pressure, and
   (d) heating the body by conduction and radiation from a surface having a temperature that is progressively varied as a function of time, from an initial temperature of 80° to 90° F., to between 95° to 120° F. throughout the first three hours of drying and is then held at between 95° and 120° F. until drying is completed.

4. The method of drying granulated bleached regular shellac which comprises the steps of:
   (a) collecting an amorphous body of granulated wet bleached regular shellac,
   (b) continuously-homogeneously redistributing the granules within the amorphous body, while
   (c) subjecting the body to a pressure no greater than substantially 10 mm. Hg absolute, and
   (d) heating the body by conduction and radiation from a surface having a temperature that is progressively varied as a function of time, from an initial temperature of 80° to 90° F., to between 110 to 120° F. throughout the first three hours of drying and is then held at between 110° to 120° F. until drying is completed.

5. The method of drying granulated bleached wax-free shellac which comprises the steps of:
   (a) collecting an amorphous body of granulated wet bleached wax-free shellac,
   (b) continuously-homogeneously redistributing the granules within the amorphous body, while
   (c) subjecting the body to a pressure no greater than substantially 15 mm. Hg absolute, and
   (d) heating the body by conduction and radiation from a surface having a temperature that is progressively varied as a function of time, from an initial temperature of 80° to 85° F. to between 95° to 100° F., throughout the first three hours of drying and is then held at between 95° and 100° F. until drying is completed.

6. The method of drying granulated bleached regular shellac which comprises the steps of:
   (a) collecting an amorphous body of granulated wet bleached regular shellac,
   (b) continuously-homogeneously redistributing the granules within the amorphous body, while
   (c) subjecting the body to a pressure no greater than substantially 10 mm. Hg absolute, and
   (d) heating the body by conduction and radiation from a surface having a temperature that is continuously varied at a rate of substantially 10 Fahrenheit degrees per hour, from an initial temperature of 80° to 90° F., to between 110° to 120° F. throughout the first three hours of drying and is then held at between 110° to 120° F. until drying is completed.

7. The method of drying granulated bleached wax-free shellac which comprises the steps of:
   (a) collecting an amorphous body of granulated wet bleached wax-free shellac,
   (b) continuously-homogeneously redistributing the granules within the amorphous body, while
   (c) subjecting the body to a pressure no greater than substantially 15 mm. Hg absolute, and (d) heating the body by conduction and radiation from a surface having a temperature that continuously varies at a rate of substantially 5 Fahrenheit degrees per hour, from an initial temperature of 80° to 85° F. to between 95° to 100° F. throughout the first three hours of drying and is then held at between 95° to 100° F. until drying is completed.

8. A method of drying granulated bleached shellac that employs a rotatable vessel that has a side wall which defines a substantially closed chamber, means for evacuating the chamber, and means for heating the interior surface of the side wall; comprising the steps of:
 (a) partially filling the chamber with wet granulated bleached shellac,
 (b) rotating the vessel to cause a thorough intramixing of the shellac granules therein, while
 (c) evacuating the chamber to a low sub-atmospheric pressure, and
 (d) heating the interior surface of the side wall to a temperature that progressively increases as a function of time, from an initial temperature of 80° to 90° F., to between 95° to 110° F. throughout the first three hours of drying, and is then held at between 95° and 120° F. until drying is completed.

9. A method of drying granulated bleached regular shellac that employs a rotatable vessel that has a side wall which defines a substantially closed chamber, means for evacuating the chamber, and means for heating the interior surface of the side wall; comprising the steps of:
 (a) partially filling the chamber with wet granulated bleached regular shellac,
 (b) rotating the vessel to cause a thorough intramixing of the shellac granules therein, while
 (c) evacuating the chamber to a pressure no greater than 10 mm. Hg absolute, and
 (d) heating the interior surface of the side wall to a temperature that is progressively increased as a function of time from an initial temperature of 80° to 90° F. to between 110° to 120° F. throughout the first three hours of drying and is held at between 110° to 120° F. until drying is completed.

10. A method of drying granulated bleached wax-free shellac that employs a rotatable vessel that has a side wall which defines a substantially closed chamber, means for evacuating the chamber, and means for heating the interior surface of the side wall; comprising the steps of:
 (a) partially filling the chamber with wet granulated bleached wax-free shellac,
 (b) rotating the vessel to cause a thorough intramixing of the shellac granules therein, while
 (c) evacuating the chamber to a pressure no greater than 15 mm. Hg absolute, and
 (d) heating the interior surface of the side wall to a temperature that is progressively increased as a function of time from an initial temperature of 80° to 85° F. to between 95° to 100° F. throughout the first three hours of drying and is held at between 95° to 100° F. until drying is completed.

11. A method of drying granulated bleached regular shellac that employs a rotatable vessel that has a side wall which defines a substantially closed chamber, means for evacuating the chamber, and means for heating the interior surface of the side wall comprising the steps of:
 (a) partially filling the chamber with wet granulated bleached regular shellac,
 (b) rotating the vessel to cause a thorough intramixing of the shellac granules therein, while
 (c) evacuating the chamber to a pressure no greater than 10 mm. Hg absolute, and
 (d) heating the interior surface of said side wall to a temperature that is continuously varied at a rate of substantially 10 Fahrenheit degrees per hour, from an initial temperature of 80° to 90° F., to between 110° to 120° F. through the first three hours of drying and is then held at between 110° to 120° F. until drying is completed.

12. A method of drying granulated bleached wax-free shellac that employs a rotatable vessel that has a side wall which defines a substantially closed chamber, means for evacuating the chamber, and means for heating the interior surface of the side wall comprising the steps of:
 (a) partially filling the chamber with wet granulated bleached wax-free shellac,
 (b) rotating the vessel to cause a thorough intramixing of the shellac granules therein, while
 (c) evacuating the chamber to a pressure no greater than 15 mm. Hg absolute, and
 (d) heating the interior surface of said side wall to a temperature that is continuously varied at a rate of substantially 5 Fahrenheit degrees per hour, from an initial temperature of 80° to 85° F. to between 95° to 100° F., throughout the first three hours of drying and is then held at between 95° to 100° F. until drying is completed.

References Cited by the Examiner

UNITED STATES PATENTS

| | | | |
|---|---|---|---|
| 210,793 | 12/78 | Luckenbach | 34—84 |
| 1,981,603 | 11/34 | Mustonen | 34—45 |
| 2,593,983 | 4/52 | Chalupa | 34—92 X |
| 2,808,657 | 10/57 | Osborne et al. | 34—92 |
| 2,874,483 | 2/59 | Brandl | 34—51 |
| 2,878,581 | 3/59 | Turati | 34—92 |
| 2,936,528 | 5/60 | Brandl | 34—92 X |
| 2,997,046 | 8/61 | Doyle | 34—92 |
| 3,059,203 | 10/62 | Hetrick | 34—45 X |

PERCY L. PATRICK, *Primary Examiner.*

NORMAN YUDKOFF, *Examiner.*